(12) United States Patent
Takao (10) Patent No.: US 7,614,596 B2
(45) Date of Patent: Nov. 10, 2009

(54) STAND FOR DISPLAY DEVICE

(75) Inventor: Mitsuyoshi Takao, Hidaka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/242,594

(22) Filed: Sep. 30, 2008

(65) Prior Publication Data
US 2009/0121097 A1 May 14, 2009

(30) Foreign Application Priority Data
Nov. 13, 2007 (JP) ............................. 2007-294718

(51) Int. Cl.
*A47G 29/00* (2006.01)
(52) U.S. Cl. ........................ 248/371; 248/917; 248/923; 248/176.3
(58) Field of Classification Search ................. 248/146, 248/176.3, 201, 371, 917, 919, 922, 923
See application file for complete search history.

(56) References Cited

U.S. PATENT DOCUMENTS

| 4,478,382 | A | * | 10/1984 | Carrier | 248/184.1 |
| 6,688,572 | B2 | * | 2/2004 | Huang et al. | 248/291.1 |
| 6,741,458 | B2 | * | 5/2004 | Wu | 361/679.21 |
| 7,516,925 | B2 | * | 4/2009 | Sawai et al. | 248/146 |
| 7,537,189 | B2 | * | 5/2009 | Jung et al. | 248/298.1 |
| 2003/0122046 | A1 | * | 7/2003 | Huong | 248/291.1 |
| 2005/0152102 | A1 | * | 7/2005 | Shin | 361/681 |
| 2006/0278795 | A1 | * | 12/2006 | Lee | 248/371 |
| 2007/0097608 | A1 | * | 5/2007 | Matsutani et al. | 361/681 |

FOREIGN PATENT DOCUMENTS

| JP | 10240141 | 9/1998 |
| JP | 2003-044165 | 2/2003 |
| JP | 2007-206278 | 8/2007 |
| JP | 2005-215193 | 9/2008 |
| JP | 3130612 | 9/2008 |

\* cited by examiner

*Primary Examiner*—J. Allen Shriver, II
*Assistant Examiner*—Bradley H Duckworth
(74) *Attorney, Agent, or Firm*—Blakely, Sokoloff, Taylor & Zafman LLP (57) ABSTRACT

According to one embodiment, a support stand for a display device is formed by attaching a stand cover to two stand members. Each of the two stand members includes a first member and a second member upward extending therefrom. The second member has a structure in which an attachment portion is bent at substantially right angles with respect to a base portion that opposes the base portion of the first member. The second member is secured to the first member by inserting bolts through bolt holes formed through three flanges.

5 Claims, 12 Drawing Sheets

STAND FOR DISPLAY DEVICE

CROSS-REFERENCE TO RELATED APPLICATIONS

This application is based upon and claims the benefit of priority from Japanese Patent Application No. 2007-294718, filed Nov. 13, 2007, the entire contents of which are incorporated herein by reference.

BACKGROUND

1. Field

One embodiment of the invention relates to a display device stand for supporting a flat display device such as a liquid crystal TV set.

2. Description of the Related Art

In general, a flat display device, such as a liquid crystal TV set, needs a support stand to be attached to its frame. Jpn. Pat. Appln. KOKAI Publication No. 2007-206278, for example, discloses a support stand for supporting display devices, in which a metal pole is stood on a metal base, and a resin cover is provided on the resultant structure (see, in particular, paragraph [0036] and FIG. 3).

In support stands of this type, the greater the size of the display device, the higher the required stability. Therefore, in accordance with increases in screen size, it has become mainstream to produce a support stand base by reliable aluminum die casting.

However, when the base as the main body of the support stand is formed by aluminum die casting, the resultant support stand becomes heavy, and hence the entire display device becomes heavy.

Further, since such bases are produced by molding, size errors may well occur between base products. Namely, when support stand bases are molded using aluminum die casting, it is strongly possible that the screens of the resultant display devices will be undesirably inclined.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

One embodiment according to the invention will be described hereinafter with reference to the accompanying drawings. In general, according to the embodiment of the invention, a stand for supporting a display device is formed by attaching a stand cover (30) to two stand members that each include a first member placed on a mount table, and a second member standing therefrom. The second member has a structure in which an attachment portion (27) extends substantially perpendicular to a base portion (25) opposing the base portion (23) of the first member. The second member is bolted to the first member by bolts (45) inserted through bolt holes formed through three flanges (24, 26 and 28).

Figure 1:
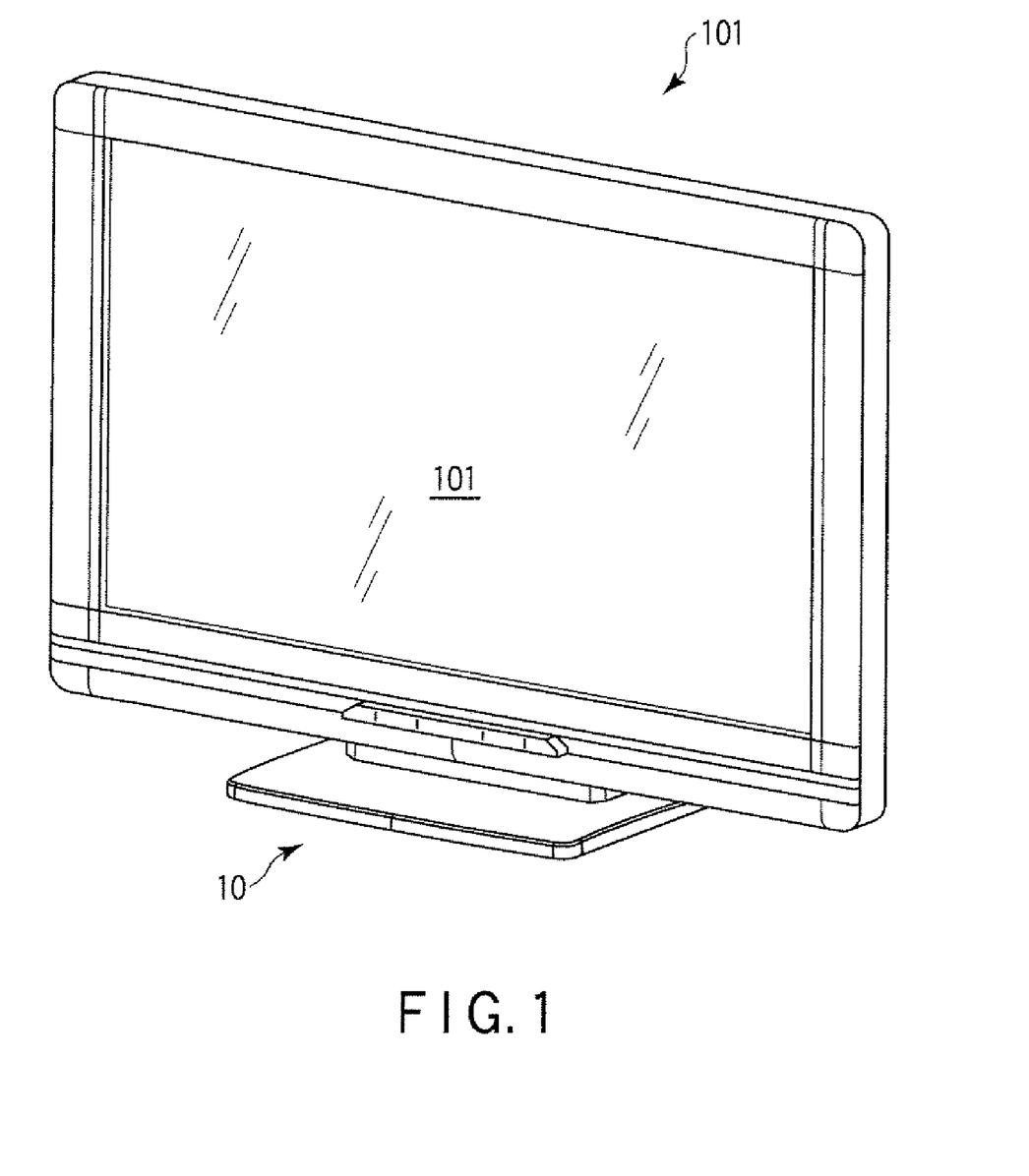
FIG. 1 is a perspective view illustrating the front side of a display device according to an embodiment of the invention.
Figure 2:
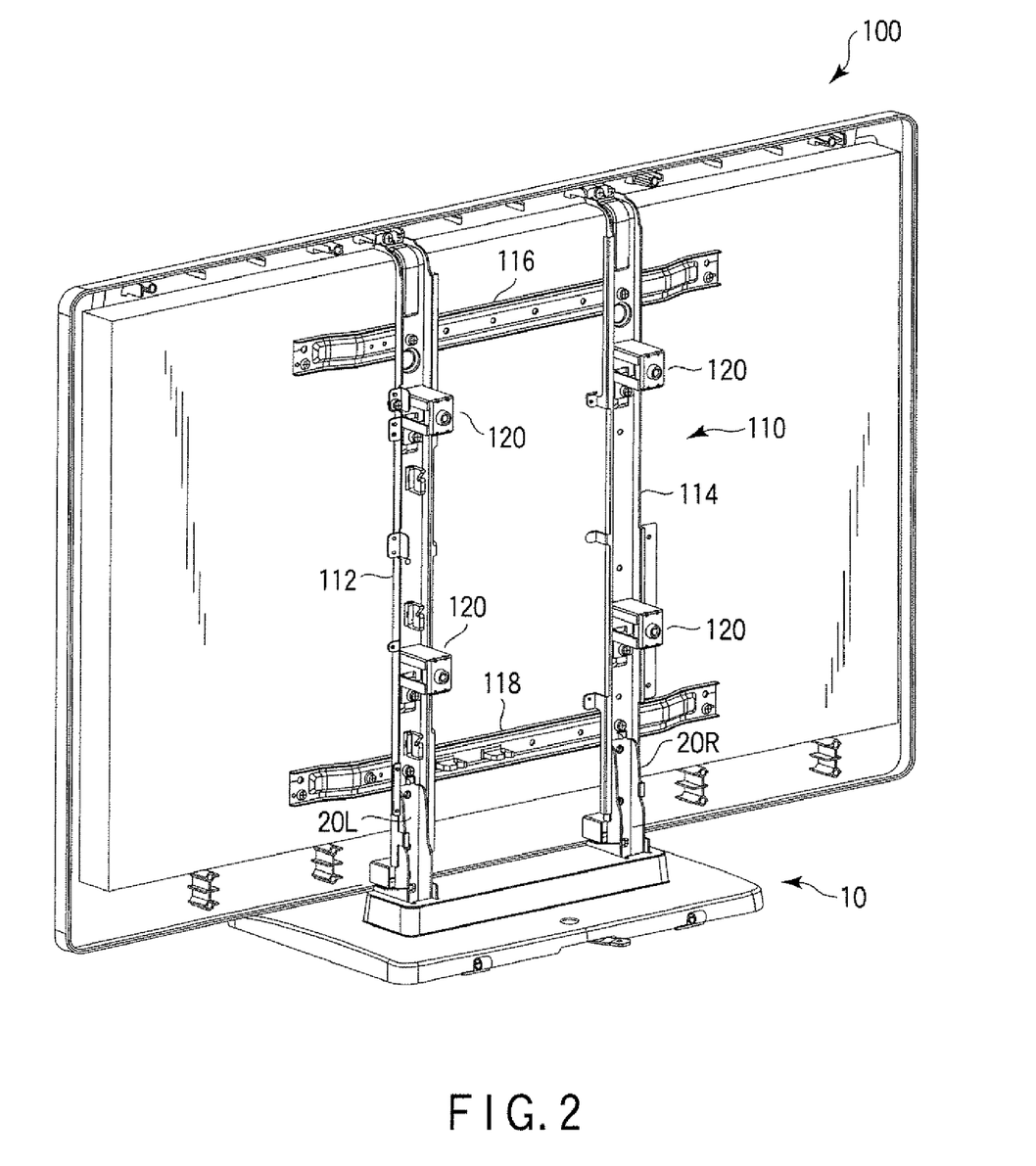
FIG. 2 is a perspective view illustrating the rear side of the display device according to the embodiment.

FIG. 1 shows, viewed diagonally from the front, a display device 100 according to the embodiment, i.e., a flat display device 100 such as a liquid crystal display or plasma display. FIG. 2 shows, viewed diagonally from behind, a state in which the rear cover of the display device 100 is removed. As shown in FIG. 1, a display section 101 is provided at the front side of the display device 100.

As shown in FIG. 2, a frame 110 is provided at the rear side of the display device 100. Namely, the frame 110 is provided inside the rear cover (not shown). The frame 110 according to the embodiment comprises two vertical frame members 112 and 114 extending vertical and parallel to each other, and two horizontal frame members 116 and 118 extending horizontal, parallel to each other, and coupled to the frame members 12 and 14 like a pound sign. Four wall-hanging members 120 for hanging the display device 100 on a wall are attached to the middle portions of each of the two vertical frame members 112 and 114. Thus, when the rear cover (not shown) is attached to cover the frame 110, only the four wall-hanging members 120 are exposed at the rear side of the display device 100.

Figure 3:
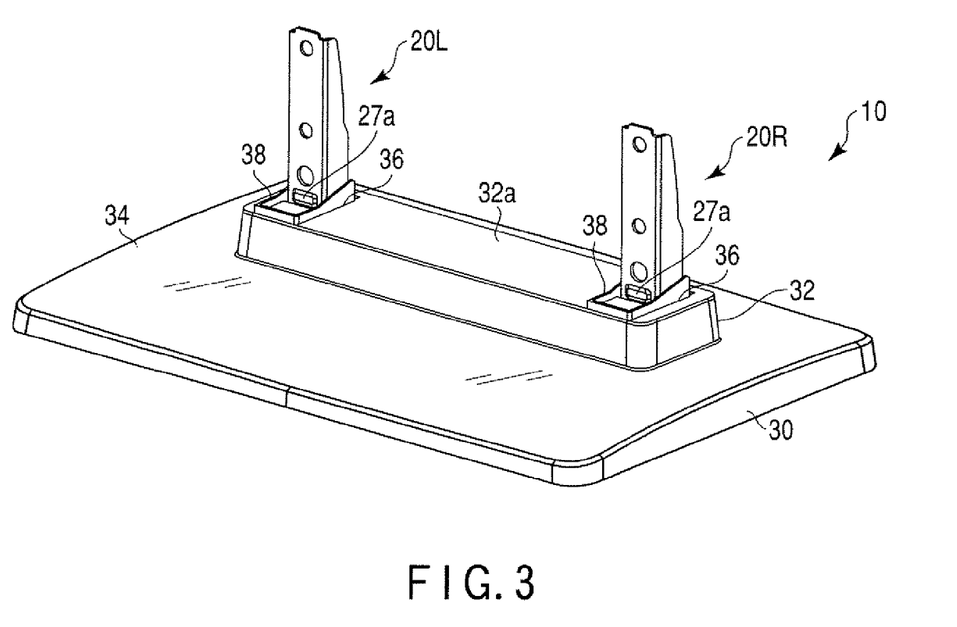
FIG. 3 is a perspective view illustrating the front side of a support stand incorporated in the display device of FIG. 1.
Figure 4:
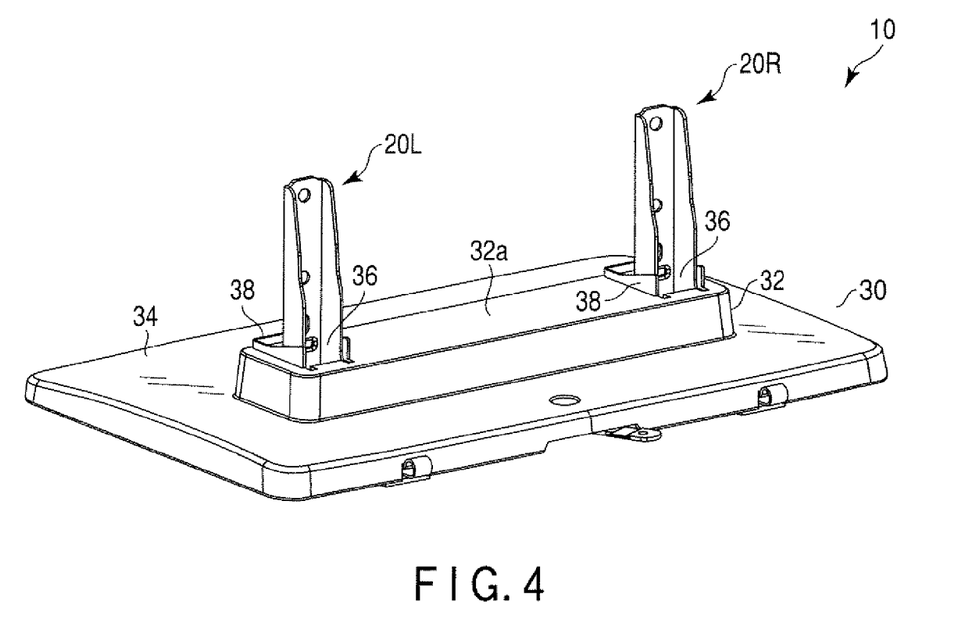
FIG. 4 is a perspective view illustrating the rear side of the support stand shown in FIG. 3.

FIG. 3 shows, viewed diagonally from behind, a support stand 10, according to the embodiment of the invention, for supporting the display device 100 in its standing position. FIG. 4 shows the support stand 10 viewed diagonally from behind. The display device 100 having the above-mentioned flat-panel structure cannot be stood by itself, and hence needs to be hung on a wall or from the ceiling, or to be stood using the support stand 10 described below. More specifically, the support stand 10 is secured to the frame 110 of the display device 100.

As shown in FIGS. 3 and 4, the support stand 10 comprises a pair of substantially T-shaped stand members 20L and 20R, and a stand cover 30 (cover member). As can be seen from FIG. 2, the stand members 20L and 20R are separate from each other by the distance corresponding to that between the above-mentioned two vertical frame members 112 and 114, and are bolted to the frame members 112 and 114, respectively. Since the stand members 20L and 20R have the same structure, they may hereinafter collectively be referred to as "the stand members 20."

The stand cover 30 includes a housing 32 that upward projects and covers the connections of first and second members 21 and 22, described later, incorporated in each of the stand members 20L and 20R, and also includes a cover main body 34 that covers the first members 21 of the stand members 20L and 20R and allows them to be bolted thereto. The upper surface 32a of the housing 32 has substantially rectangular insertion holes 36 formed therein for inserting the second members 22 of the stand members 20L and 20R. Respective sleeves 38 are fitted in the insertion holes 36.

Figure 5:
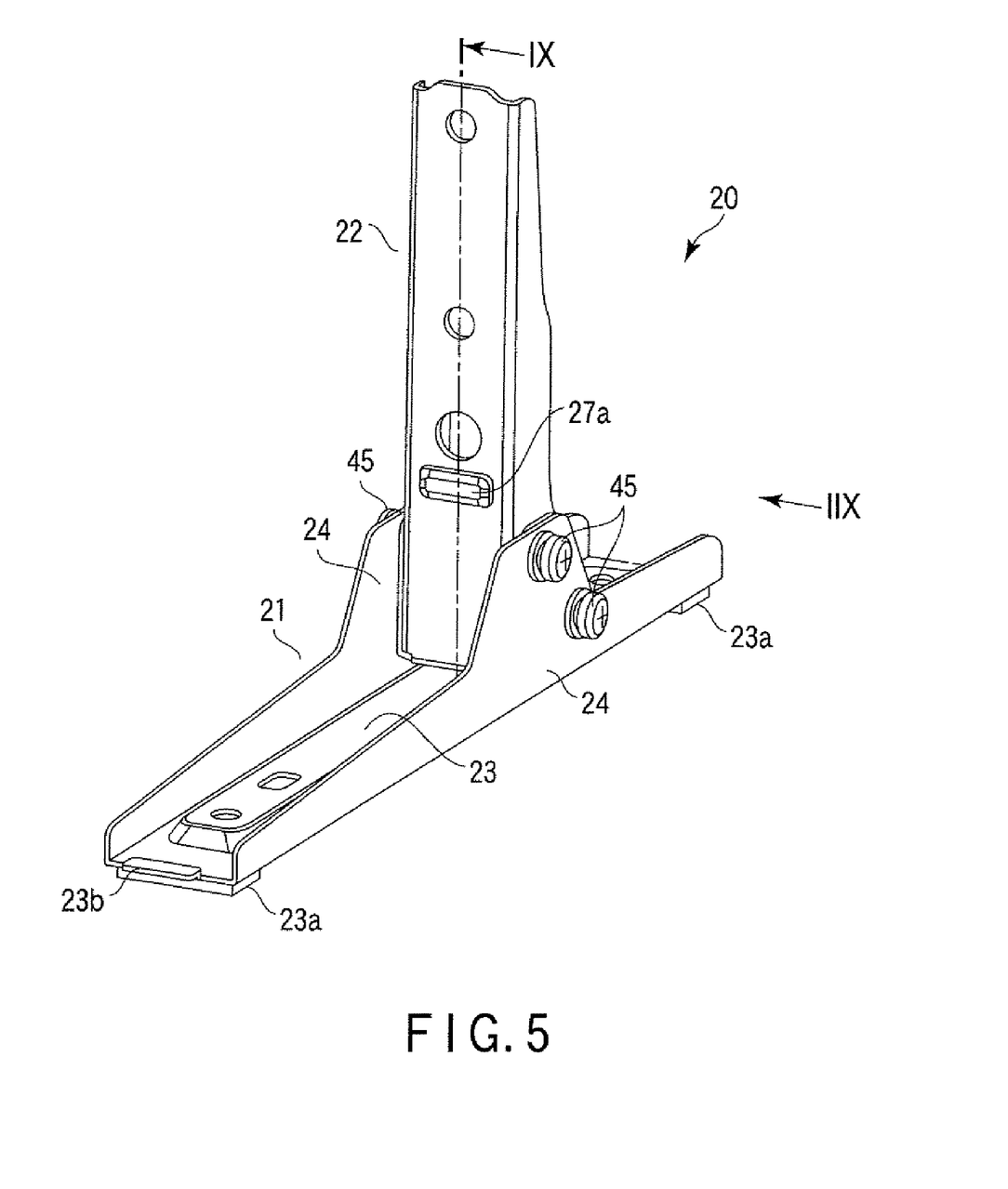
FIG. 5 is an enlarged perspective view of a stand member incorporated in the support stand shown in FIG. 3.
Figure 6:
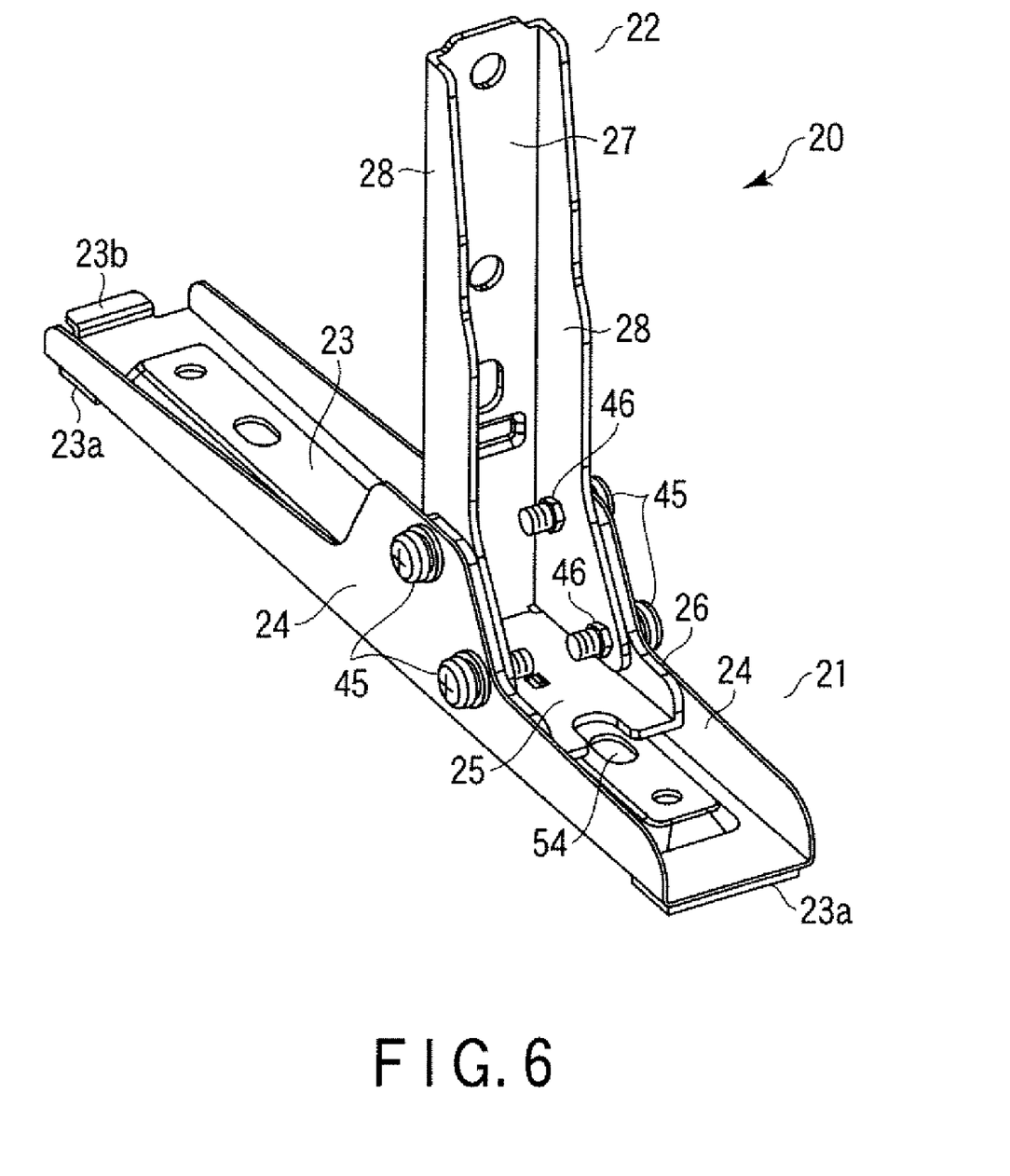
FIG. 6 is an enlarged perspective view of the rear side of the stand member shown in FIG. 5.

FIG. 5 shows the stand member 30, viewed in the same direction as in FIG. 3. FIG. 6 shows the stand member 30, viewed in the same direction as in FIG. 4. Referring to FIGS. 5 and 6, a more detailed description will be given of the structure of each stand member 20.

Each stand member 20 includes a first member 21 mounted on a mount table (not shown) on which the display device 100 is to be mounted, and a second member 22 bolted to the first member and set in a standing position. Since the second member 22 is secured to the frame 110 of the display device 100, the angle between the first and second members 21 and 22 assumed when they are attached to each other influences the angle of inclination of the display section 101 of the display device 100.

The first and second members 21 and 22 are each formed by forming holes in a single metal plate and bending it. Since each stand member 20 is thus formed by processing two metal plates, the resultant support stand 10 can be reduced in weight and in the amount of metal used, processed easily, and hence produced at low cost, compared to the conventional case using aluminum die casting.

The first member 21 includes a slim base portion 23 (first base portion) to be mounted on the mount table (not shown), and two slim, flat and opposing flanges 24 (first flanges) formed integral with the base portion 23 and upward extending from the base portion 23. Two pads 23a are attached to the front and rear portions of the bottom of the base portion 23. The first member 21 is designed to a length greater than the thickness of the display device 100, and is located such that the longitudinal axis of the member 21 is substantially perpendicular to the display device 100. Further, an engagement claw 23b is attached to the front end of the base portion 23 for engaging the first member 21 with the stand cover 30, as will be described later. The flanges 24 are formed by upward bending side portions of the base portion 23 at right angles. The flanges 24 longitudinally extend along the entire base portion 23.

Since both opposite flanges 24 are thus longitudinally extended along the entire base portion 23, the bending strength of the first member 21 is enhanced, and hence the first member 21 can be made thinner to a degree corresponding to the increase in the bending strength. In particular, in the embodiment, since the base portion 23 is relatively narrowed to make the two flanges 24 relatively close to each other, the rigidity of the first member can be enhanced to a desired degree. This structure enabled the thickness of the first member 21 to be reduced to 1 [mm], with a desired mechanical strength secured.

The second member 22 includes a base portion 25 (second base portion), two flanges 26 (second flanges), an attachment portion 27, and two flanges 28 (third flanges), which are formed integral with each other. The base portion 25 extends between the two flanges 24 of the first member 21 above and substantially parallel to the base portion 23 of the first member 21. The two flanges 26 are formed by upward bending the opposite sides of the base portion 25 along the inner surfaces of the flanges 24 of the first member 21. The attachment portion 27 upward extends from the base portion 25. The two flanges 28 are formed by rearward bending the opposite sides of the attachment portion 27 such that they overlap the respective inner surfaces of the two flanges 26. The attachment portion 27 has a frontward projecting boss 27a. The second member 22 is also formed by processing a single metal plate.

The two flanges 26 extend along the entire sides of the base portion 25, and the flanges 28 extend along the entire sides of the attachment portion 27. These long flanges 16 and 28 enhance the bending strength of the second member 22. By virtue of this structure, the thickness of the second member 22 could be set to as thin as 1.6 [mm] with a desired mechanical strength secured. In particular, since the flanges 26 are shaped to overlap the flanges 28 when the attachment portion 27 is bent at substantially right angles with respect to the base portion 25, the twisting strength of the second member 22 is enhanced.

On the other hand, the portion of the flanges 24 of the first member 21 that is connected to the second member 22 is upward protruded such that they overlap the overlapping flanges 26 and 28 of the second member 22. Thus, in the stand member 20, the flanges 24 of the first member 21 overlap the overlapping flanges 26 and 28 of the second member 22, and these flanges 24, 26 and 28 have two bolt holes 41, two bolt holes 42 and two bolt holes 43, respectively. When the flanges 24, 26 and 28 overlap each other, each combination of the bolt holes 41, 42 and 43 are substantially coaxial, and hence the six flanges in total are fixed by four bolts 45 in total to thereby fix the first and second members 21 and 22 to each other.

In the embodiment, when the first and second members 21 and 22 are bolted to each other, they are held by jigs (not shown) to slightly adjust the attachment angle of the second member 22 relative to the first member 21. At this time, the bending angle of the base portion 25 of the second member 22 relative to the attachment portion 27 of the same is also adjustable. Thus, with the attachment angle between the first and second members 21 and 22 appropriately adjusted, the four bolts 45 in total are fastened to secure the first and second members 21 and 22. Since there are allowances between the bolts 45 and bolt holes 41, 42 and 43, the attachment angles can be slightly adjusted within the allowances.

Figure 7:
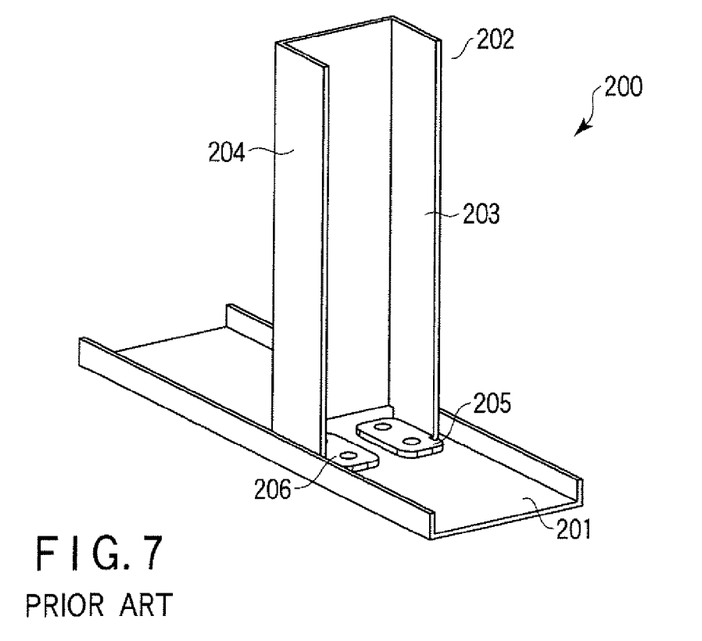
FIG. 7 is a perspective view illustrating an example of a conventional stand member.

In contrast, in a conventional stand member 200 as shown in FIG. 7, the attachment angle of a support member 202 attached in a standing position to a base member 201 mounted on a mount table (not shown) cannot be adjusted. Specifically, in the structure of FIG. 7, the lower ends 205 and 206 of flanges 203 and 204 provided at both sides of the support member 202 are bent and bolted on the inner surface of the base member 201. Therefore, it is impossible to vary the attachment angle of the support member 202 with respect to the base member 201, even if the bolt holes have allowances.

Figure 8:
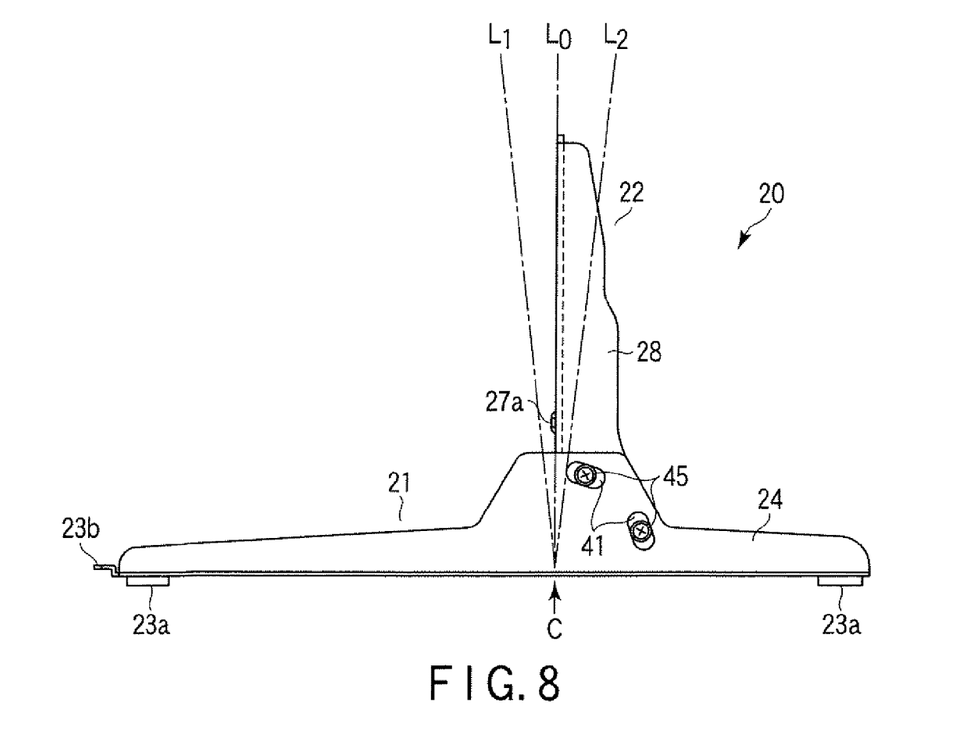
FIG. 8 is a side view useful in explaining the angular adjustment of the stand member shown in FIG. 5.
Figure 9:
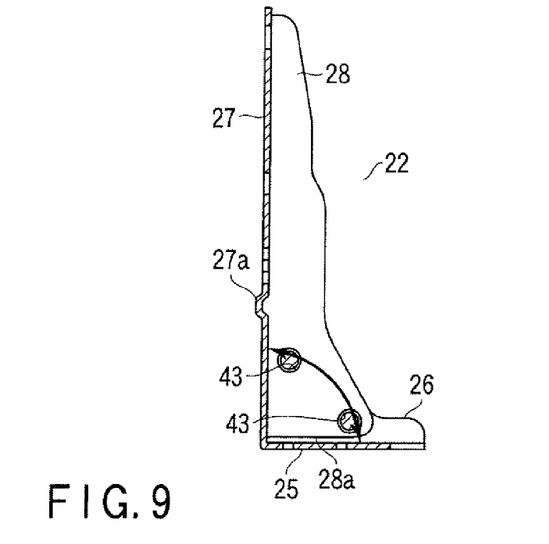
FIG. 9 is a sectional view useful in explaining the angular adjustment of the conventional stand member of FIG. 7.

Referring then to FIGS. 8 and 9, a more detailed description will be given of the angle adjustment of the stand member 20. FIG. 8 shows the stand member 20 viewed from the direction indicated by arrow IIX in FIG. 5. FIG. 9 shows the cross section of the second member 22 of the stand member 20 taken along line IX in FIG. 5. Although in the above description, the bolt holes 41, 42 and 43 are circular ones of a certain size slightly wider than the bolts 45, they may be long holes, as will be described below.

When the stand member 20 is assembled, firstly, the second member 22 is stood between the two flanges 24 of the first member 21 such that the base portion 25 of the second member 22 opposes the inner surface of the base portion 23 of the first member 21. In the initial state, the base portion 25 and attachment portion 27 of the second member 22 are bent at substantially right angles with each other. Further, burring (tapping) may be performed on the flanges 28 of the second member 22 to directly fasten the bolts 45, instead of using nuts.

After that, the second member 22 is moved relative to the first member 21 to align the bolt holes (see FIG. 8) formed in the flanges 24 of the first member 21, the bolt holes formed in the flanges 24 of the base portion 25 of the second member 22, and the bolt holes 43 (see FIG. 9) formed in the flanges 28 of the base portion 27 of the second member 22.

In this state, each bolt 45 is inserted through the superposed holes 41, 42 and 43, and a nut 46 (see FIG. 6) is fitted on the tip of each bolt 45. As a result, four bolts 45 and four nuts 46 are attached in total. Before fastening the bolts 45 and nuts 46, the first and second members 21 and 22 are movable within the allowances of the bolt holes 41, 42 and 43, but are prevented from being completely separate from each other.

In this state, the first and second members 21 and 22 are held by jigs (not shown) to adjust the attachment angle therebetween. Assume here that the attachment angle is adjusted by inclining the second member 22 within the range defined by one-dot chain line L1 and one-dot chain line L2 with respect to the reference position (designed position) indicated by one-dot chain line L0, as shown in FIG. 8.

For instance, when the second member 22 is inclined from the position indicated by line L0 to the position indicated by line L1 (i.e., leftward in FIG. 8), if there are only small allowances between the bolt holes 41, 42 and 43 and the bolts 45, the second member 22 cannot greatly be inclined leftward. However, if, for example, the two bolt holes 41 (first bolt holes) formed in the flanges 24 of the first member 21 are elongated with respect to the center C of rotation of the second member 22, the bolts 45 can be rotated to the degree corresponding to the length of the bolt holes 41, whereby the second member 22 can be inclined to the degree.

In contrast, when the second member 22 is inclined from the position indicated by line L0 to the position indicated by line L2 (i.e., rightward in FIG. 8), the rightward rotation of the second member 22 is stopped when its base portion 25 contacts the inner surface of the base portion 23 of the first member 21. Namely, the second member 22 cannot be inclined to the same degree as in the case of the leftward inclination. In this case, the rightward inclination can be increased to a certain degree by beforehand setting, slightly sharper, the initial angle between the base portion 25 and attachment portion 27 of the second member 22, or by beforehand providing a clearance between the base portion 25 of the second member 22 and the base portion 23 of the first member 21.

Alternatively, at least the bolt holes 42 (second bolt holes) formed in the flanges 26 extending from the base portion 25 of the second member 22, or the bolt holes 43 (third bolt holes) formed in the flanges 28 extending from the attachment portion 27 of the second member 22 may be formed arcuate so as to allow adjustment of the bending angle between the base portion 25 and attachment portion 27. In particular, the attachment portion 27 can be rightward inclined with the bending angle varied, by elongating the bolt holes 42 and/or 43 in a direction in which the attachment portion 27 can be bent to form a sharp angle with respect to the base portion 25.

In this case, it is necessary to work the lower edges 28a (see FIG. 9) of the flanges 28 provided inside the flanges 26, so as not to contact the inner surface of the base portion 25. Also when the attachment portion 27 is inclined leftward, it is effective to work the bolt holes 42 and 43 in the same way as the above. Namely, these holes may be modified so as to enable the bending angle between the base portion 25 and attachment portion 27 to be obtuse.

In any case, the first and second members 21 and 22 can be assembled with a desired attachment angle by fastening the four bolts and nuts 46 with the base portion 23 of the first member 21 and the attachment portion 27 of the second member 22 arranged at a desired attachment angle, thereby reliably fixing the two groups of flanges 24, 26 and 28.

As described above, in the embodiment, since stand members having a desired mechanical strength can be each formed simply by processing two metal plates (i.e., forming holes in the plates and bending them) and bolting them to each other, the support stand 10 of the display device 100 can be made light at low cost.

Further, in the process of assembling the first and second members 21 and 22 of the stand member 20, since these members can be bolted to each other with their attachment angle adjusted to a desired value, errors in size between first members and second members, caused during manufacturing the members, can be absorbed, and the attachment angle between the second member 22 and the first member 21, and hence the inclination angle of the display section 101 of the display device 100 can be adjusted to a desirable value.

Referring then to FIGS. 10 to 18, a description will be given of an erroneous assemblage preventing mechanism used to attach the stand cover 30 to the stand members 20L and 20R constructed as above.

Figure 10:
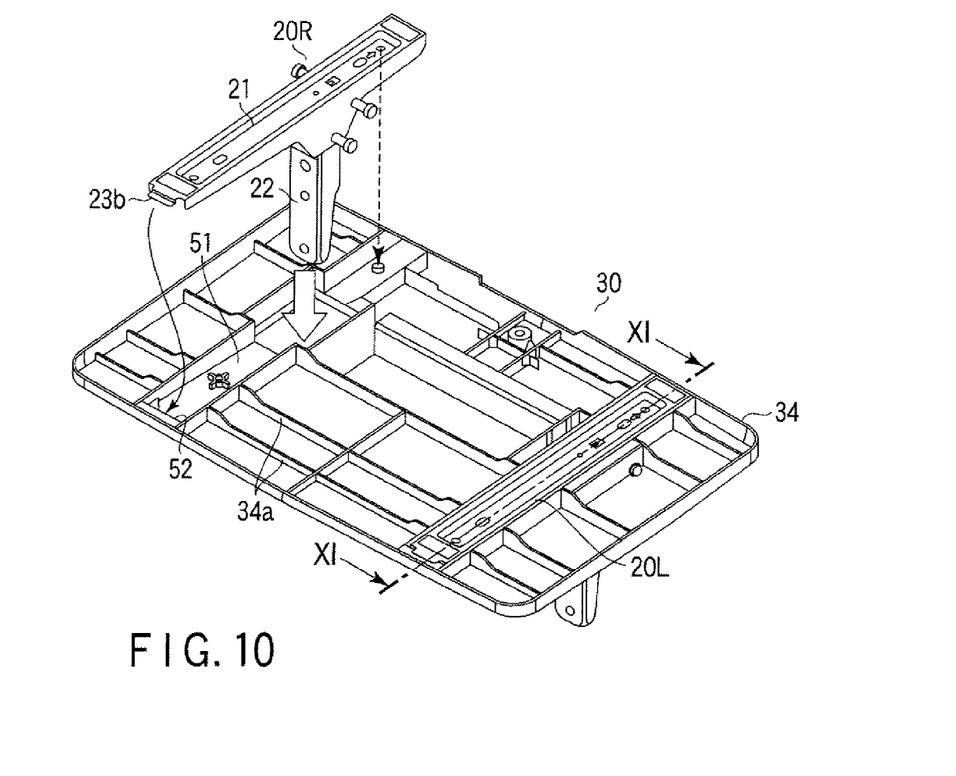
FIG. 10 is a view useful in explaining a method of attaching the stand member.

As shown in FIG. 10, the stand members 20L and 20R constructed as above are each attached to the stand cover 30 by inserting, from below the cover main body 34 of the stand cover 30, the second member 22 through the sleeve 38 (see, for example, FIG. 11) fitted in the insertion hole 36 formed in the cover main body 34. At this time, the frontward projecting engagement claws 23b of the first members 21 of the stand members 20L and 20R are engaged with engagement portions 52 incorporated in the cover main body 34. FIG. 10 shows only one of the engagement portions 52.

Receiving recesses 51, only one of which is shown in FIG. 10, are formed in the back side of the cover main body 34 along the respective short sides of the same. Further, to enhance the twisting and bending strength of the cover main body 34, a plurality of ribs 34a are formed on the back side of the cover main body 34 integral with the same, extending along the long sides of the same.

Figure 11:
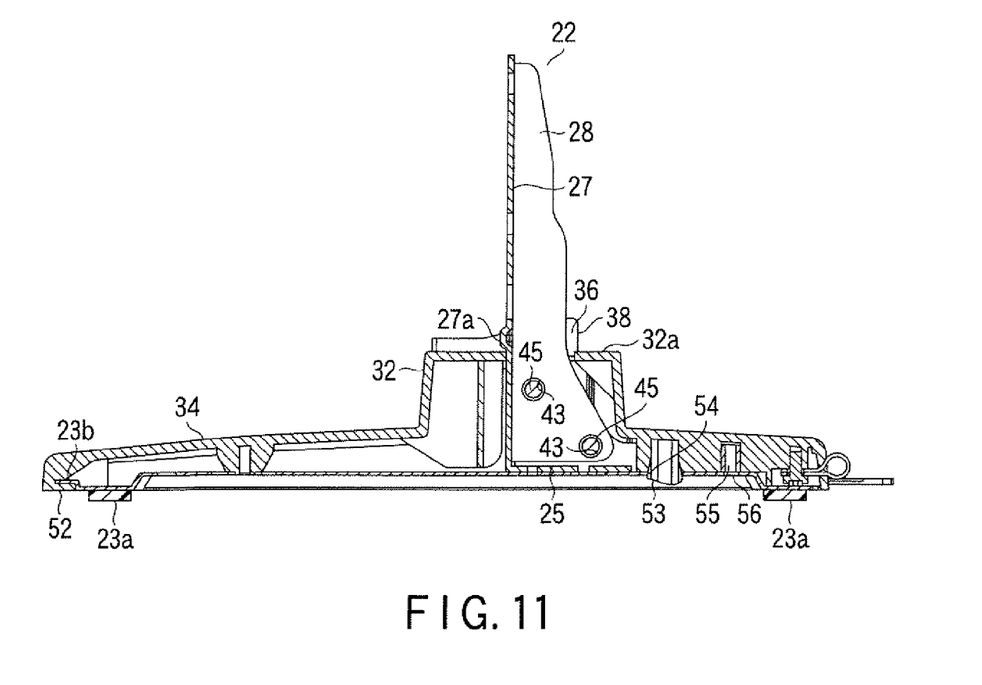
FIG. 11 is a sectional view illustrating a state in which the stand member is correctly attached to a cover main body.
Figure 12:
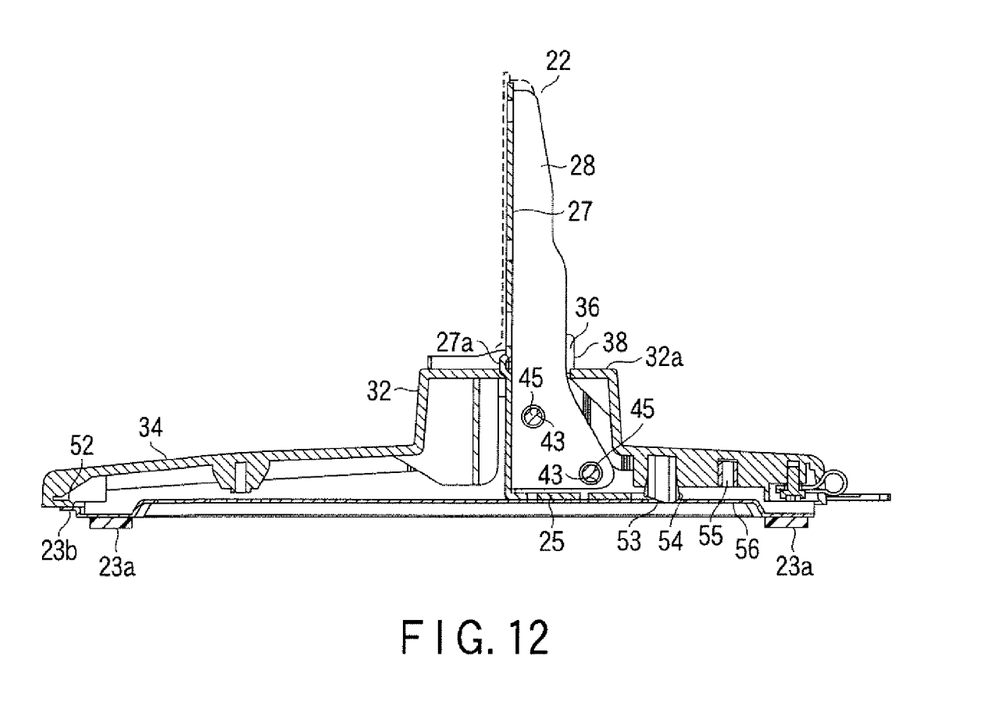
FIG. 12 is a sectional view illustrating a state in which the stand member is incorrectly attached to the cover main body.

FIG. 11 is a sectional view taken along line XI of FIG. 10 and illustrating a state in which the stand member 20 is correctly attached to the stand cover 30. FIG. 12 is a sectional view illustrating a state in which the stand member 20 is incorrectly attached to the stand cover 30. The state shown in FIG. 12 will hereinafter be referred as "erroneous assemblage."

Figure 13:
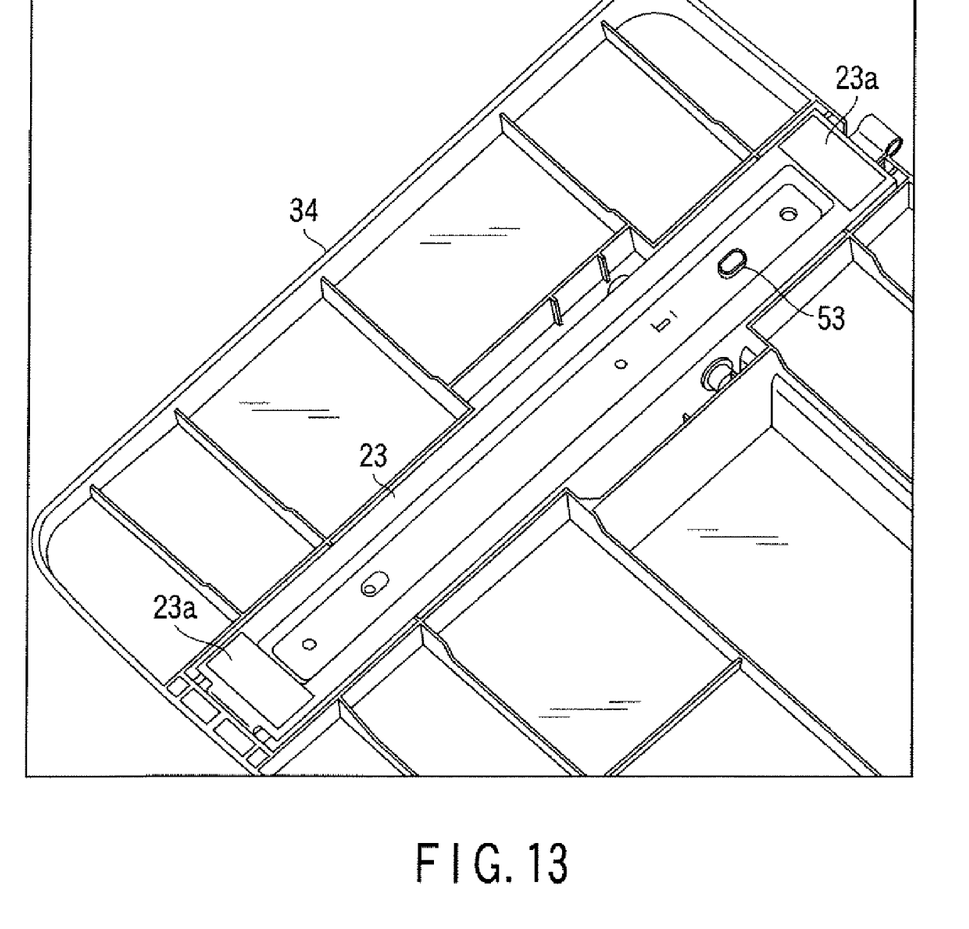
FIG. 13 is a view obtained when the state in which the stand member is correctly attached to the cover main body is viewed from the back of the body.

When the stand member 20 is correctly attached to the stand cover 30 as shown in FIG. 11, the second member 22 is inserted through the sleeve 38 projecting from the upper surface 32a of the housing 32 of the stand cover 30, and the engagement claw 23b of the first member 21 is engaged with the engagement portion 52 of the cover main body 34. FIG. 13 is a view obtained when the state in which the stand member 20 is correctly attached to the cover main body 34 is viewed from the back side of the body.

Figure 14:
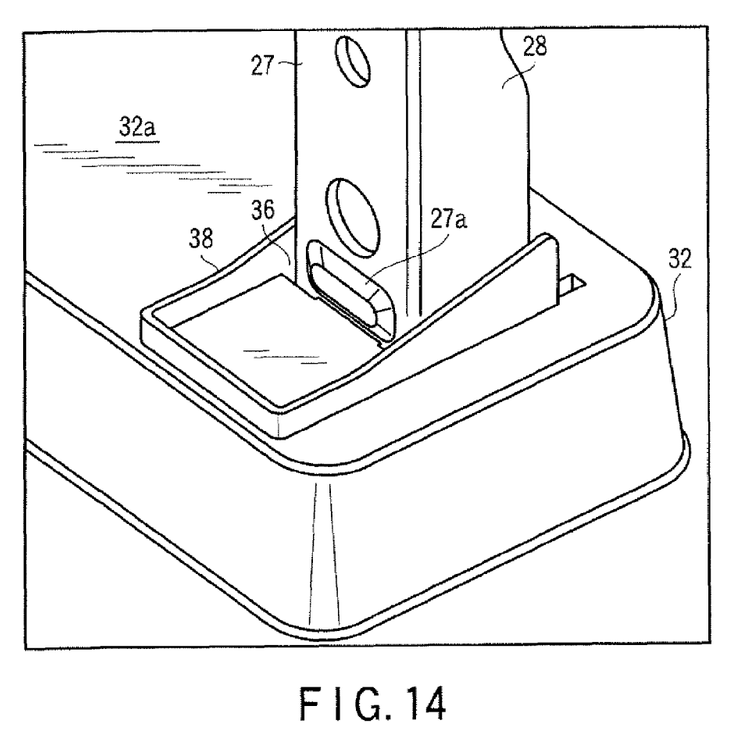
FIG. 14 is a perspective view illustrating the state of the boss of a second member included in the stand member, assumed when the stand member is correctly attached to the cover main body.
Figure 15:
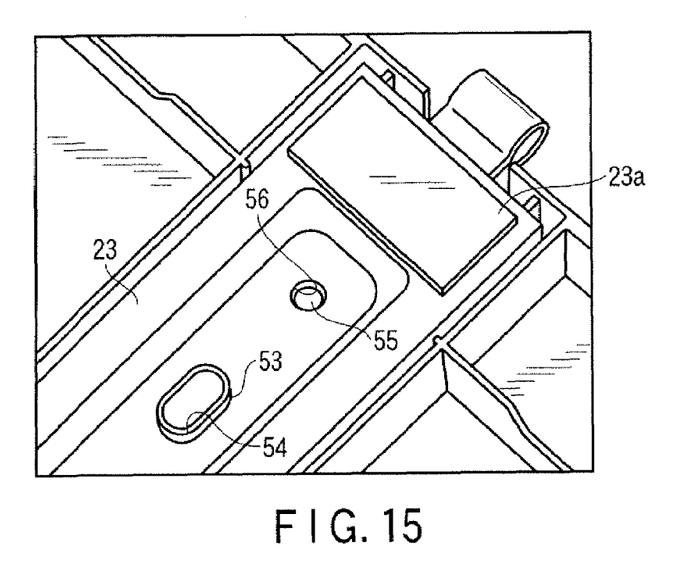
FIG. 15 is an enlarged bottom view illustrating an essential part of the structure shown in FIG. 13.
Figure 16:
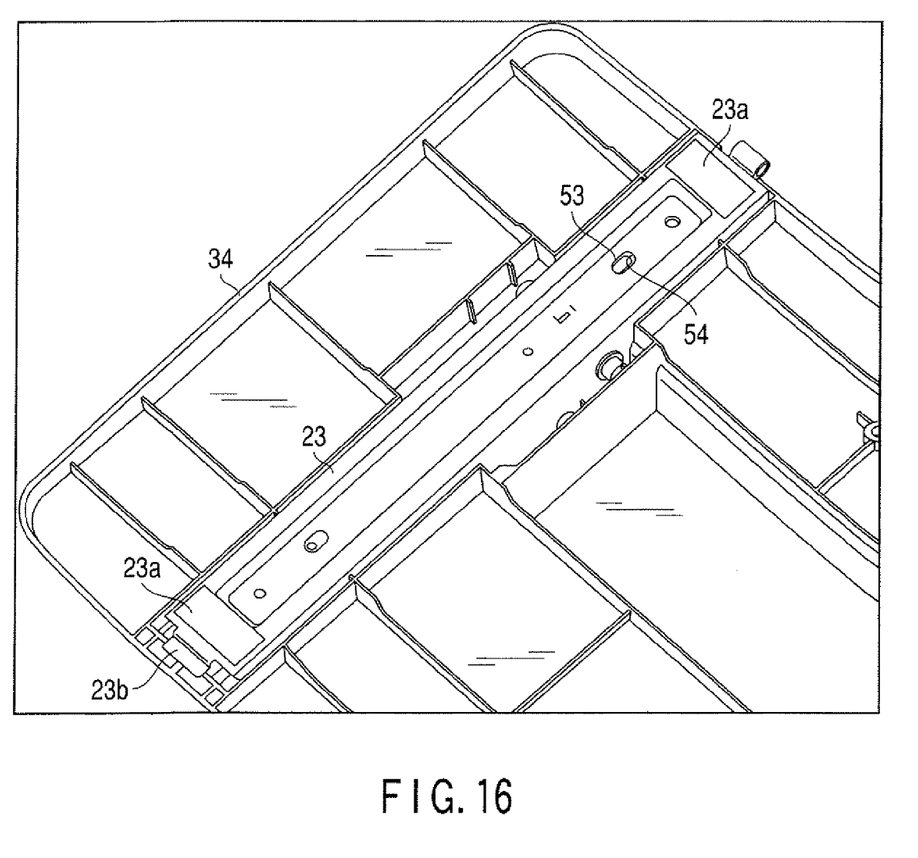
FIG. 16 is a view obtained when the state in which the stand member is incorrectly attached to the cover main body is viewed from the back of the body.
Figure 17:
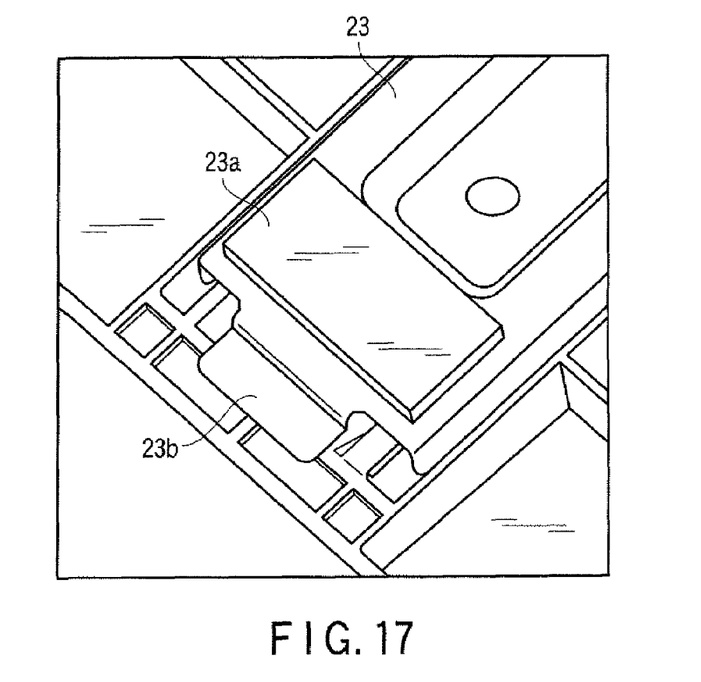
FIG. 17 is an enlarged bottom view illustrating an essential part of the structure shown in FIG. 16.

When the stand member 20 is correctly attached to the cover main body 34, the frontward projecting boss 27a on the outer surface of the attachment portion 27 of the second member 22 is positioned at a higher level than the upper surface 32a of the housing 32 as shown in FIG. 14, and a boss 53 projecting from the back side of the cover main body 34 is inserted through a hole 54 formed through the base portion 23 of the first member 21, as shown in FIG. 15. In this state, a bolt hole 55 formed in the cover main body 34 is coaxial with a bolt hole 56 formed in the base portion 23 of the first member 21, thereby enabling the stand member 20 to be secured to the stand cover 30.

In contrast, when the stand member 20 is incorrectly attached to the cover main body 34 as shown in FIG. 12 (i.e., in the case of erroneous assemblage), the engagement claw 23b of the first member 21 is disengaged from the engagement portion 52 of the cover main body 34 and is placed on the back side of the body 34. In this state, the boss 27a of the second member 22 is not placed over the upper surface 32a of the housing 32, and the stand member 20 is vertically and horizontally slightly deviated from the correct position indicated by the broken line in FIG. 12.

More specifically, the stand member 20 is downward and rightward deviated from the correct position indicated by the broken line in FIG. 12. Namely, since the engagement claw 23b of the first member 21 is disengaged from the engagement portion 52 of the cover main body 34, a slight gap is formed between the first member 21 and cover main body 34. Further, since the boss 27a of the second member 22 is not placed over the upper surface 32a of the housing 32, the stand member 20 deviates slightly rearward with respect to the stand cover 30 by the degree corresponding to the thickness of the boss 27a.

Figure 18:
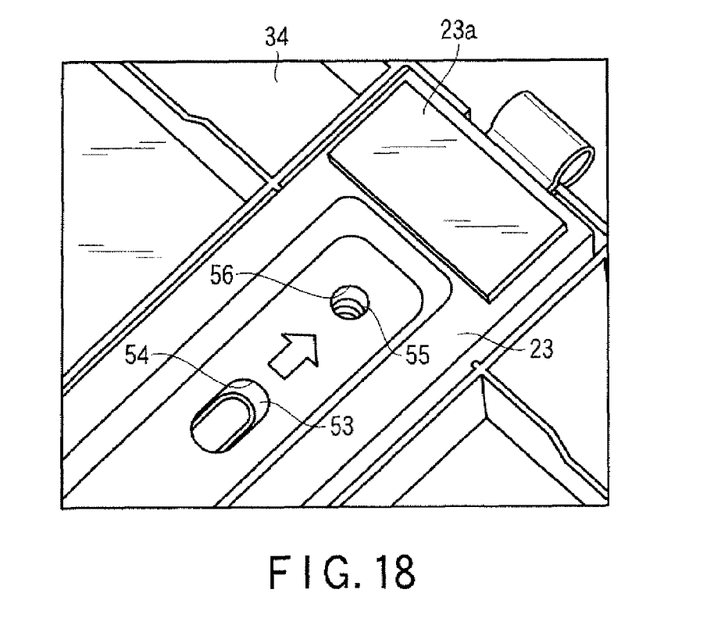
FIG. 18 is an enlarged bottom view illustrating another essential part of the structure shown in FIG. 16.

Thus, when the stand member 20 is erroneously attached to the stand cover 30, the boss 53 provided on the back side of the cover main body 34 cannot be inserted through the hole 54 formed in the base portion 23 of the first member 21, and the above-mentioned bolt holes 55 and 56 are deviated from each other, as is shown in FIG. 18. Namely, in the erroneously assembled state shown in FIG. 12, the bolt holes 55 and 56 do not coincide with each other, and hence the stand member 20 cannot be secured to the stand cover 30.

As described above, in the support stand 10 of the embodiment, the boss 27a projecting from the attachment portion 27 of the second member 22, the hole 54 formed through the base portion 23 of the first member 21, and the boss 53 projecting from the back side of the cover main body 34 and to be inserted through the hole 54 cooperate to serve as the erroneous assemblage preventing mechanism for preventing erroneous assemblage of the stand cover 30 and stand members 20. Therefore, the stand members 20 can be reliably attached to the stand cover 30.

While a certain embodiment of the invention has been described, it has been presented by way of example only, and is not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A stand for supporting a flat display device in a stand position, comprising:

two first members placed on a mount table for mounting the flat display device, and extending parallel to each other and perpendicular to a longitudinal axis of the flat display device, with a gap defined therebetween, the display device being positioned at longitudinally middle portions of the two first members;

two second members bolted to the first members, upward extending therefrom, and secured to a frame of the flat display device, wherein the first members each include a first flat, base portion opposing the mount table and extending perpendicular to the longitudinal axis of the flat display device, and two first plate-like flanges upward extending from both long sides of the first base portion, the first base portion and the two first flanges being formed integral;

the second members each include a second flat, base portion opposing an inner surface of the first base portion which is out of contact with the mount table, two second plate-like flanges upward extending from both sides of the second base portion along inner surfaces of the first flanges, an attachment portion upward extending from a front end of the second base portion and secured to the frame of the display device, and two third plate-like flanges rearward extending from both sides of the attachment portion and overlapping the second flanges, the second base portion, the two second flanges, the attachment portion and the two third flanges being formed integral with each other; and a bolt is inserted through first to third bolt holes coaxially formed in overlapping portions of the first to third flanges to secure the first and second members to each other.

2. The stand according to claim 1, wherein the first bolt hole formed in each of the first flanges allows the bolt to move when the second member is inclined with respect to the first member.

3. The stand according to claim 2, wherein at least one of the second bolt hole formed in each of the second flanges, and the third bolt hole formed in each of the third flanges allows the bolt to move when a bending angle of the attachment portion with respect to the second base portion is adjusted.

4. The stand according to claim 1, wherein the first flanges extend along entire long sides of the first base portion, and the third flanges extend along entire long sides of the attachment portion.

5. The stand according to claim 1, further comprising a cover member having two insertion holes which insert the two second members therethrough, and covering the two first members, and wherein the first and second members include an erroneous assemblage preventing mechanism which prevents the first and second members from being erroneously attached to the cover member.

* * * * *